(12) United States Patent
Chu et al.

(10) Patent No.: US 10,784,763 B2
(45) Date of Patent: Sep. 22, 2020

(54) DYNAMIC SLEW RATE CONTROL

(71) Applicant: MediaTek Inc., Hsin-Chu (TW)

(72) Inventors: Kuan-Yu Chu, Taipei (TW);
HuaChiang Huang, Taoyuan (TW);
Chih-Chen Li, Taichung (TW);
Shan-Fong Hong, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/912,396

(22) Filed: Mar. 5, 2018

(65) Prior Publication Data

US 2018/0262097 A1 Sep. 13, 2018

Related U.S. Application Data

(60) Provisional application No. 62/467,864, filed on Mar. 7, 2017.

(51) Int. Cl.
*H02M 1/08* (2006.01)
*H02M 3/158* (2006.01)
*H02M 1/00* (2006.01)

(52) U.S. Cl.
CPC ............ *H02M 1/08* (2013.01); *H02M 3/1588* (2013.01); *H02M 3/1584* (2013.01); *H02M 2001/0019* (2013.01); *H02M 2001/0022* (2013.01); *H02M 2001/0029* (2013.01); *Y02B 70/1466* (2013.01)

(58) Field of Classification Search
CPC .................. H02M 2001/0029; H02M 1/08
See application file for complete search history.

(56) References Cited

U.S. PATENT DOCUMENTS

| | | |
|---|---|---|
| 5,408,150 A | 4/1995 | Wilcox |
| 5,481,178 A | 1/1996 | Wilcox et al. |
| 5,705,919 A | 1/1998 | Wilcox |
| 5,929,620 A | 7/1999 | Dobkin et al. |
| 6,100,678 A | 8/2000 | Hobrecht |
| 6,144,194 A | 11/2000 | Varga |
| 6,177,787 B1 | 1/2001 | Hobrecht |
| 6,304,066 B1 | 10/2001 | Wilcox et al. |
| 6,441,653 B1 | 8/2002 | Spurlin |

(Continued)

FOREIGN PATENT DOCUMENTS

| | | |
|---|---|---|
| CN | 101093958 B | 6/2010 |
| CN | 101388615 B | 9/2012 |

(Continued)

OTHER PUBLICATIONS

Extended Search Report dated Jul. 19, 2018 in connection with European Application No. 18160591.6.

(Continued)

*Primary Examiner* — Seokjin Kim
(74) *Attorney, Agent, or Firm* — Wolf, Greenfield & Sacks, P.C.

(57) ABSTRACT

An inverter circuit may include an inverter, a driver coupled to the inverter, and a slew rate control module configured to modify a slew rate of the driver. The slew rate may be modified based on a magnitude of a load driven by the inverter circuit. The magnitude of the load driven by the inverter circuit may be indicated by a current representing a load current or a voltage representing an input voltage. The slew rate may also be modified based on a mode configuration of the inverter circuit.

20 Claims, 11 Drawing Sheets

(56) References Cited

U.S. PATENT DOCUMENTS

| | | | |
|---|---|---|---|
| 6,462,525 | B1 | 10/2002 | Chen |
| 6,580,258 | B2 | 6/2003 | Wilcox et al. |
| 2011/0215779 | A1* | 9/2011 | Lee .......................... G05F 1/10 323/282 |
| 2012/0062190 | A1* | 3/2012 | Haiplik ................ H02M 3/156 323/271 |
| 2014/0159687 | A1* | 6/2014 | Lee .................... H02M 3/1588 323/282 |
| 2014/0232362 | A1* | 8/2014 | Lee ...................... H02M 3/155 323/271 |
| 2016/0294376 | A1 | 10/2016 | Kuan et al. |

FOREIGN PATENT DOCUMENTS

| | | |
|---|---|---|
| TW | 201618411 A | 5/2016 |
| TW | 201740668 A | 11/2017 |

OTHER PUBLICATIONS

No Author Listed, ST, 2/3/4 phase buck controller for VR10, VR11 and VR11.1 processor applications, L6756D, Oct. 2008, 36 pages.

No Author Listed, Analog Devices, Compact, 800 mA, 3 MHz, Simple DVS, Buck Regulator, ADP2147, 2011, 16 pages.

No Author Listed, Linear Technology, LTC3731H, 3-Phase, 600kHz, Synchronous Buck Switching Regulator Controller, 2010, 34 pages.

No Author Listed, Richtek®, RT8811B, Dual-Phase Cot Buck PWM Controller with Dynamic Voltage Control, 2013, 23 pages.

No Author Listed, Texas Instruments, TPS53647 4-Phase, D-Cap+, Step-Down, Buck Controller with NVM and PMBus™Interface for ASIC Power and High-Current Point-of-Load, SLUSC39B, Jun. 2015, Revised Feb. 2017, 122 pages.

No Author Listed, intersil®, Two-Phase Multiphase Buck PWM Controller with Integrated MOSFET Drivers, ISL6315, Data Sheet, Jul. 18, 2007, FN9222.1, 20 pages.

Yang et al., On-Chip DC-DC Converter with Frequency Detector for Dynamic Voltage Scaling Technology, APCCAS 2006, IEEE Asia Pacific Conference on Circuits and Systems, pp. 666-669.

\* cited by examiner

DYNAMIC SLEW RATE CONTROL

CROSS REFERENCE TO RELATED APPLICATIONS

This application claims priority to and the benefit of U.S. Provisional Patent Application Ser. No. 62/467,864, filed on Mar. 7, 2017 and entitled "Dynamic Slew Rate Control," which is hereby incorporated herein by reference in its entirety.

TECHNICAL FIELD

The present disclosure relates to inverter circuits, and in particular to inverter circuits with dynamic slew rate control.

BACKGROUND

Inverter circuits are used for many applications including, for example, output bus drivers, switching regulators, and DC-to-DC converters. An inverter circuit may be joined with other circuits on a printed circuit board (PCB) to form an electronic assembly, which may be packaged alone or with other electronic assemblies.

SUMMARY

Inverter circuits with dynamic slew rate control are provided.

Some embodiments relate to a method for controlling a driver of an inverter. The method may comprise detecting a magnitude of a load driven by the inverter, and modifying a slew rate of the driver of the inverter based on the magnitude of the load.

In some embodiments, modifying the slew rate of the driver of the inverter may comprise reducing the slew rate of the driver of the inverter when the detected magnitude of the load increases.

In some embodiments, modifying the slew rate of the driver of the inverter may comprise increasing the slew rate of the driver of the inverter when the detected magnitude of the load decreases.

In some embodiments, the detecting step may comprise detecting a mode configuration of the inverter, and the modifying step may comprise modifying the slew rate of the driver of the inverter based on the detected mode configuration of the inverter.

In some embodiments, the mode configuration of the inverter circuit may be selected from a plurality of modes comprising dynamic voltage scaling (DVS) mode and multi-phase mode.

In some embodiments, detecting the magnitude of the load driven by the inverter may comprise detecting a current representing a load current.

In some embodiments, modifying the slew rate of the driver of the inverter may comprise modifying the slew rate of the driver of the inverter to a first predetermined level when the detected current is higher than a reference current.

In some embodiments, modifying the slew rate of the driver of the inverter may comprise modifying the slew rate of the driver of the inverter to a second predetermined level when the detected current is lower than the reference current, wherein the second predetermined level is higher than the first predetermined level.

In some embodiments, detecting the magnitude of the load driven by the inverter may comprise detecting a voltage representing an input voltage.

In some embodiments, modifying the slew rate of the driver of the inverter may comprise modifying the slew rate of the driver of the inverter to a third predetermined level when the detected voltage is higher than a reference voltage.

In some embodiments, modifying the slew rate of the driver of the inverter may comprise modifying the slew rate of the driver of the inverter to a fourth predetermined level when the detected voltage is lower than the reference voltage, wherein the fourth predetermined level is higher than the third predetermined level.

Some embodiments relate to an inverter circuit. The inverter circuit may include an inverter, a driver coupled to the inverter, the driver being configured to receive a first signal, and a slew rate control module coupled to the driver. The slew rate control module may be configured to receive the first signal and a second signal indicating a magnitude of a load driven by the inverter circuit. The slew rate control module may modify a slew rate of the driver based on the second signal.

In some embodiments, the slew rate control module may be configured to receive a third signal indicating a mode configuration of the inverter circuit, and the slew rate control module may modify the slew rate of the driver based on the third signal.

In some embodiments, the mode configuration of the inverter circuit may be selected from a plurality of modes comprising dynamic voltage scaling (DVS) mode and multi-phase mode.

In some embodiments, the second signal may be a current representing a load current, and the slew rate control module may comprise a comparator configured to compare the current to a reference current.

In some embodiments, the slew rate control module may comprise an OR gate configured to receive the first signal and an output of the comparator, and the OR gate may output to the driver.

In some embodiments, the second signal may be a voltage representing an input voltage, and the slew rate control module may comprise a comparator configured to compare the voltage to a reference voltage.

In some embodiments, the slew rate control module may comprise an OR gate configured to receive the first signal and an output of the comparator, and the OR gate may output to the driver.

In some embodiments, the slew rate control module may reduce the slew rate of the driver when the second signal indicates that the magnitude of the load increases.

In some embodiments, the slew rate control module may increase the slew rate of the driver when the second signal indicates that the magnitude of the load decreases.

The foregoing summary is provided by way of illustration and is not intended to be limiting.

BRIEF DESCRIPTION OF DRAWINGS

In the drawings, each identical or nearly identical component that is illustrated in various figures is represented by a like numeral. For purposes of clarity, not every component may be labeled in every drawing. The accompanying drawings are not necessarily drawn to scale, with emphasis instead being placed on illustrating various aspects of the techniques and devices described herein.

DETAILED DESCRIPTION

The inventors have recognized and appreciated that, for circuits with a wide dynamic current range, parasitic resistances and inductances introduced by a printed circuit board (PCB) or other packaging components may cause signal bounce, in which the signal varies in response to transients. Signal bounce includes, for example, ground bounce, supply voltage bounce, and output voltage bounce. As an example of ground bounce, a parasitic inductor may be connected between an internal device ground and an external system ground. A voltage across the parasitic inductor due to a varying current may cause the internal ground to be at a different potential than the external ground. Some devices in the circuit may be stressed and perhaps damaged due to the internal-to-external ground potential difference.

The inventors have recognized and appreciated that conventional solutions keep the slew rate of an inverter's driver at the same level for various loading conditions and mode configurations. However, arbitrarily selecting one slew rate for various loading conditions and mode configurations may cause issues. For example, if the slew rate is selected under the heaviest loading condition, peak power efficiency of a converter circuit (e.g., a buck converter) may be poor, e.g., lower than 80%. On the other hand, if a slew rate is selected by Pulse Frequency Mode (PFM) peak current, it may be difficult to design package components (e.g., PCB layout), or Laterally Diffused MOSFET (LDMOS) may be needed. As a result, a safe operating area (SOA) of transistors in the inverter's driver is reduced (e.g., FIG. 10A). An SOA may refer to the voltage and current conditions over which a transistor can be expected to operate normally. A transistor operating outside its SOA may cause a circuit malfunction. A person of ordinary skill in the art would recognize that the SOA may be presented in transistor datasheets as a graph with drain-to-source voltage ($V_{DS}$) as x axis and gate-to-source voltage ($V_{GS}$) as y axis; the SOA may refer to the area under the curve. However, the techniques described herein are not limited as to a particular manner of illustrating the SOA.

The inventors have recognized and appreciated that dynamically controlling slew rate of an inverter circuit may allow improved or maximized utilization of transistors' SOA. Signal bounce may be more serious when an inverter circuit drives a heavy load than when it drives a light or middle-level load. The currents and/or voltages may be higher when the inverter circuit drives a heavy load than a light or middle-level load. A load driven by an inverter circuit may be determined as heavy, middle-level, or light by comparing a magnitude of the load to one or more threshold values. When the inverter circuit drives a heavy load, reducing the slew rate of the inverter's driver may mitigate the effect of signal bounce and thus allow the transistors in the inverter circuit to operate safely with a wider range of $V_{DS}$ for a particular $V_{GS}$. On the other hand, when the inverter circuit drives a light or middle-level load, the slew rate of the inverter's driver may be increased over that used when the inverter circuit drives a heavy load, such that the inverter can produce an output voltage that responds more quickly.

In some embodiments, an inverter circuit may include an inverter driven by a driver. A slew rate of an output of the driver may be controlled by a slew rate control module. Both the driver and the slew rate control module may receive a first signal. In some embodiments, the first signal may be a pulse width modulated (PWM) signal. The slew rate control module may receive a second signal indicating a magnitude of a load driven by the inverter circuit. In some embodiments, the slew rate control module may reduce the slew rate of the output of the driver when the second signal indicates that the magnitude of the load increases. In some embodiments, the slew rate control module may increase the slew rate of the output of the driver when the second signal indicates that the magnitude of the load decreases.

In some embodiments, the second signal that indicates the magnitude of the load driven by the inverter circuit may be a signal representing a load current. In some embodiments, the second signal that indicates the magnitude of the load driven by the inverter circuit may be a voltage representing an input voltage.

In some embodiments, the slew rate control module may receive a third signal that indicates a mode configuration of the inverter circuit. The mode configuration may be selected from a plurality of modes including dynamic voltage scaling (DVS) mode and multi-phase mode. The slew rate control module may modify a slew rate of the inverter's driver based on the mode configuration of the inverter circuit. In some embodiments, the slew rate control module may reduce the slew rate of the inverter's driver when the third signal indicates that the inverter circuit is operating in DVS mode or multi-phase mode.

Figure 1A:
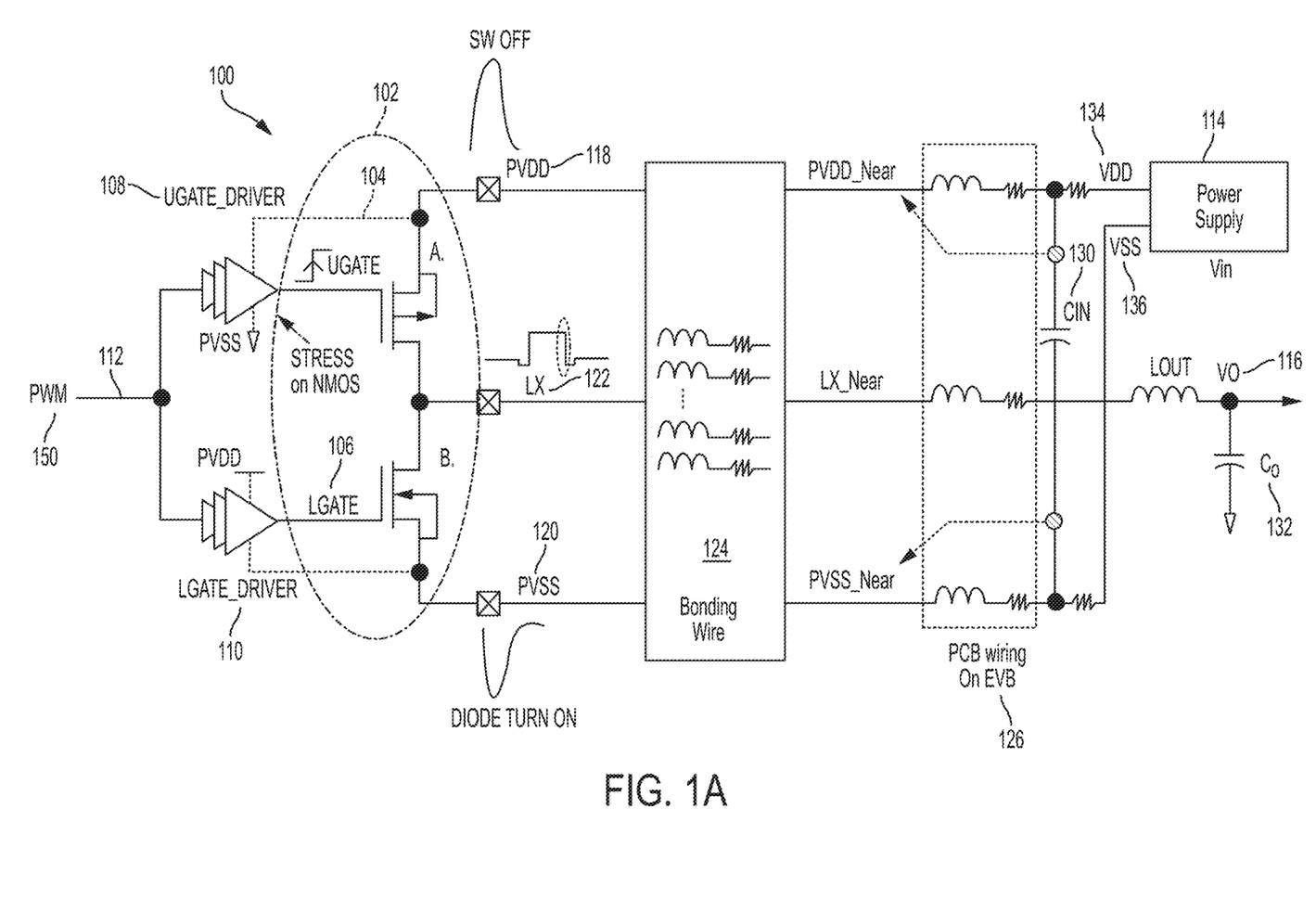
FIG. 1A is a schematic diagram of an inverter circuit without dynamic slew rate control.

FIG. 1A is a schematic diagram of an inverter circuit 100 without dynamic slew rate control. The inverter circuit 100 may include an input terminal 112 to receive a pulse width modulated (PWM) waveform 150, an inverter 102 having a first transistor UGATE 104 and a second transistor LGATE 106, a first driver UGATE_DRIVER 108 to drive the UGATE, a second driver LGATE_DRIVER 110 to drive the LGATE, an output capacitor $C_o$ 132, an output terminal $V_o$ 116 to drive a load (not shown), and a power supply Vin 114, which may be shared with the load. The power supply 114 may include a positive supply voltage VDD 134 and a negative supply voltage VSS 136. The inverter 102 may include an internal positive power supply voltage PVDD 118, an internal negative power supply voltage PVSS 120, and an internal output LX 122. The first and second drivers UGATE_DRIVER 108 and LGATE_DRIVER 110 may share the internal positive and negative power supplies PVDD and PVSS with the inverter 102.

The inverter circuit 100 may also include parasitic resistances and inductances induced by packaging components. For example, bonding wires may induce parasitic resistances and inductances 124; PCB wirings may induce parasitic resistance and inductance 126, and parasitic capacitance $C_{IN}$ 130. The parasitic resistances and inductances 124 and 126 may cause discrepancies between the internal positive supply voltage PVDD 118 and the positive supply voltage VDD 134. The parasitic resistances and inductances 124 and 126 may also cause discrepancies between the internal negative supply voltage PVSS 120 and the negative supply voltage VSS 136.

The output terminal $V_o$ 116 may switch from a high voltage to a low voltage, which may be referred to as a falling edge transition, or may switch from a low voltage to a high voltage, which may be referred to as a rising edge transition. During switching, the output capacitor $C_o$ 132 and the parasitic capacitance $C_{IN}$ 130 may charge or discharge, and may generate transient currents. The transient currents may be a function of $C_o$, $C_{IN}$, and voltage changes on $C_o$ and $C_{IN}$ over time t ($\Delta V/\Delta t$). The transient currents flowing through the parasitic resistances and inductances 124 and 126 may generate voltages across the parasitic resistances and inductances. The voltage across the parasitic inductances may be a function of the transient current changes over time t ($\Delta I/\Delta t$). As a result, the internal positive supply voltage PVDD 118 may be at a different voltage from the positive supply voltage VDD 134; the internal negative supply voltage PVSS 120 may be at a different voltage from the negative supply voltage VSS 136.

Figure 1B:
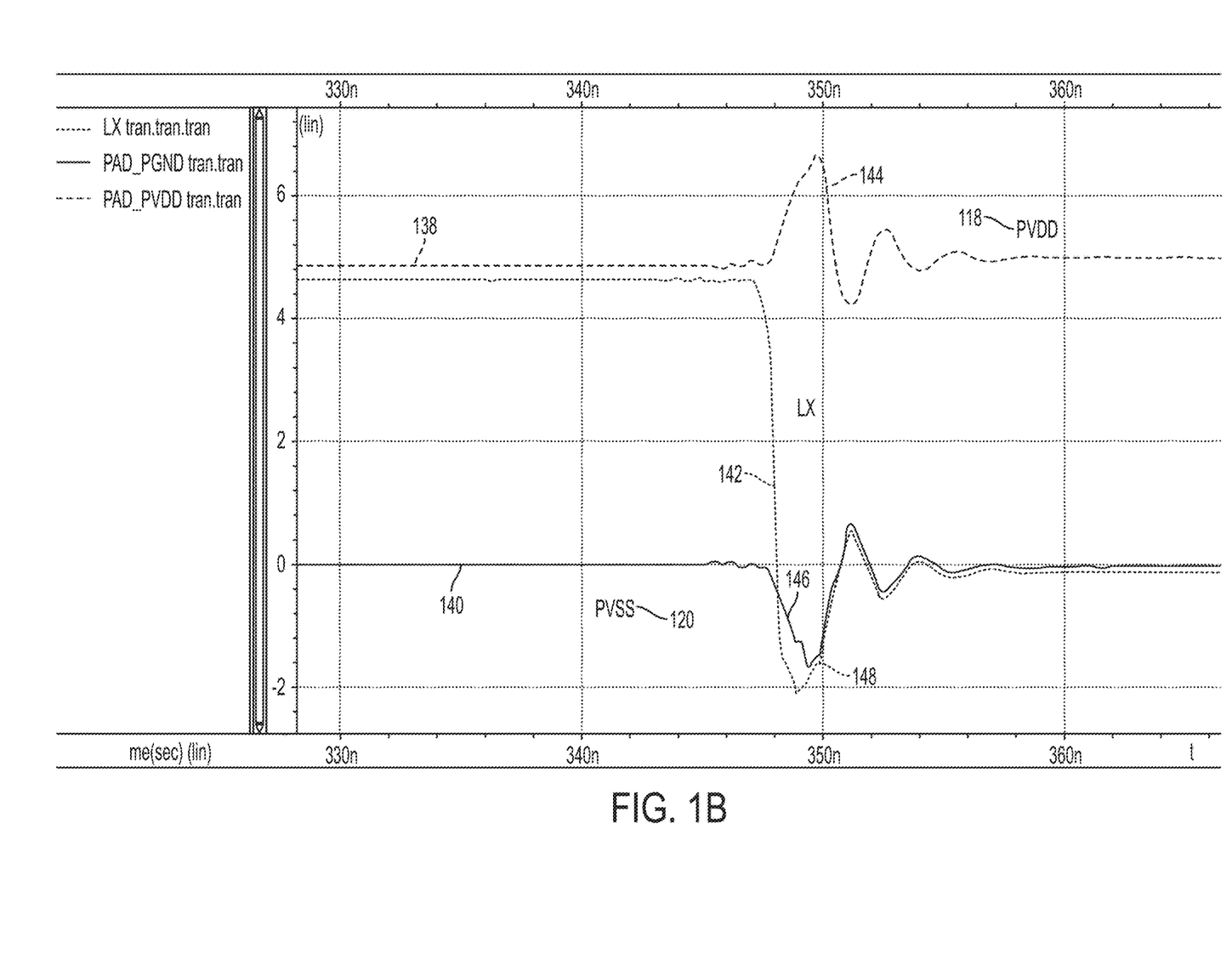
FIG. 1B is a schematic timing diagram, illustrating signal bounce in the inverter circuit of FIG. 1A.

FIG. 1B is a schematic timing diagram, illustrating signal bounce in the inverter circuit 100 during a falling edge transition of the PWM waveform 150. A curve 138 illustrates the potential level of the internal positive supply voltage PVDD 118 over time t, showing supply voltage bounce 144. A curve 140 illustrates the potential level of the internal negative supply voltage PVSS 120 over time t, showing ground bounce 146. A curve 142 illustrates the potential level of the internal output LX over time t. During the falling edge transition of the PWM waveform 150, the internal output LX follows the internal negative supply voltage PVSS 120, showing ground bounce 148. Therefore, the NMOS transistors, e.g., in the UGATE_DRIVER, are stressed due to ground bounce, e.g., 146 and 148.

Figure 2:
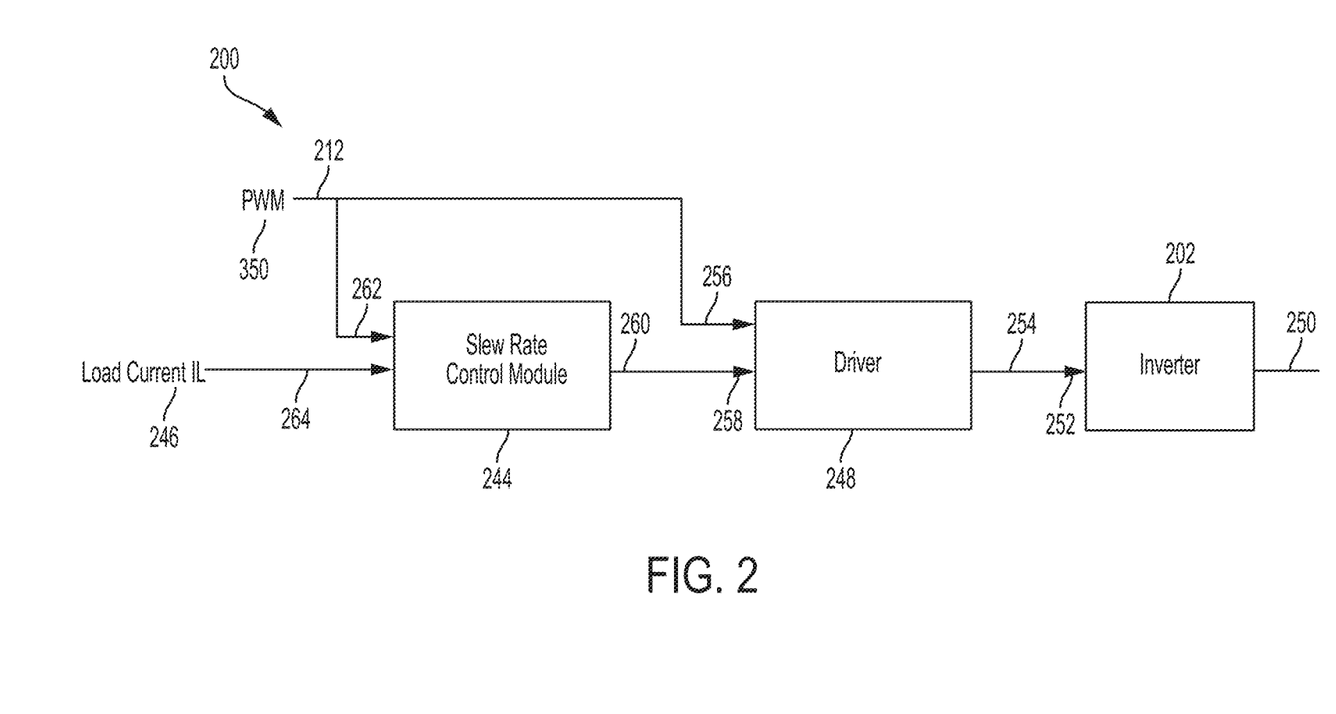
FIG. 2 is a schematic diagram of an inverter circuit with dynamic slew rate control by a current representing a load current, according to some embodiments.

FIG. 2 is a schematic diagram of an inverter circuit 200 with dynamic slew rate control, according to some embodiments. The inverter circuit 200 may include an external input terminal 212, an inverter 202, a driver 248, and a slew rate control module 244. In some embodiments, the external input terminal 212 may receive a pulse width modulated (PWM) waveform 350 from, for example, a controller. The inverter 202 may include an input terminal 252 and an output terminal 250. In some embodiments, the output terminal 250 may drive a load (not shown). The driver 248 may include a first input terminal 256, a second input terminal 258, and an output terminal 254. The first input terminal 256 of the driver 248 may be coupled to the external input terminal 212 of the inverter circuit 200. The output terminal 254 of the driver 248 may be coupled to the input terminal 252 of the inverter 202.

The slew rate control module 244 may include a first input terminal 262, a second input terminal 264, and an output terminal 260. The first input terminal 262 of the slew rate control module 244 may be coupled to the external input terminal 212 of the inverter circuit 200. The second input terminal 246 of the slew rate control module 244 may receive a load current IL 246, which may indicate a magnitude of the load driven by the inverter circuit 200. In some embodiments, a load current IL may be compared to one or more reference currents. Basing on the comparison results, the load driven by the inverter circuit may be determined as heavy, light, or middle-level. The output terminal 260 of the slew rate control module 244 may be coupled to the second input terminal 258 of the driver 248.

Figure 3:
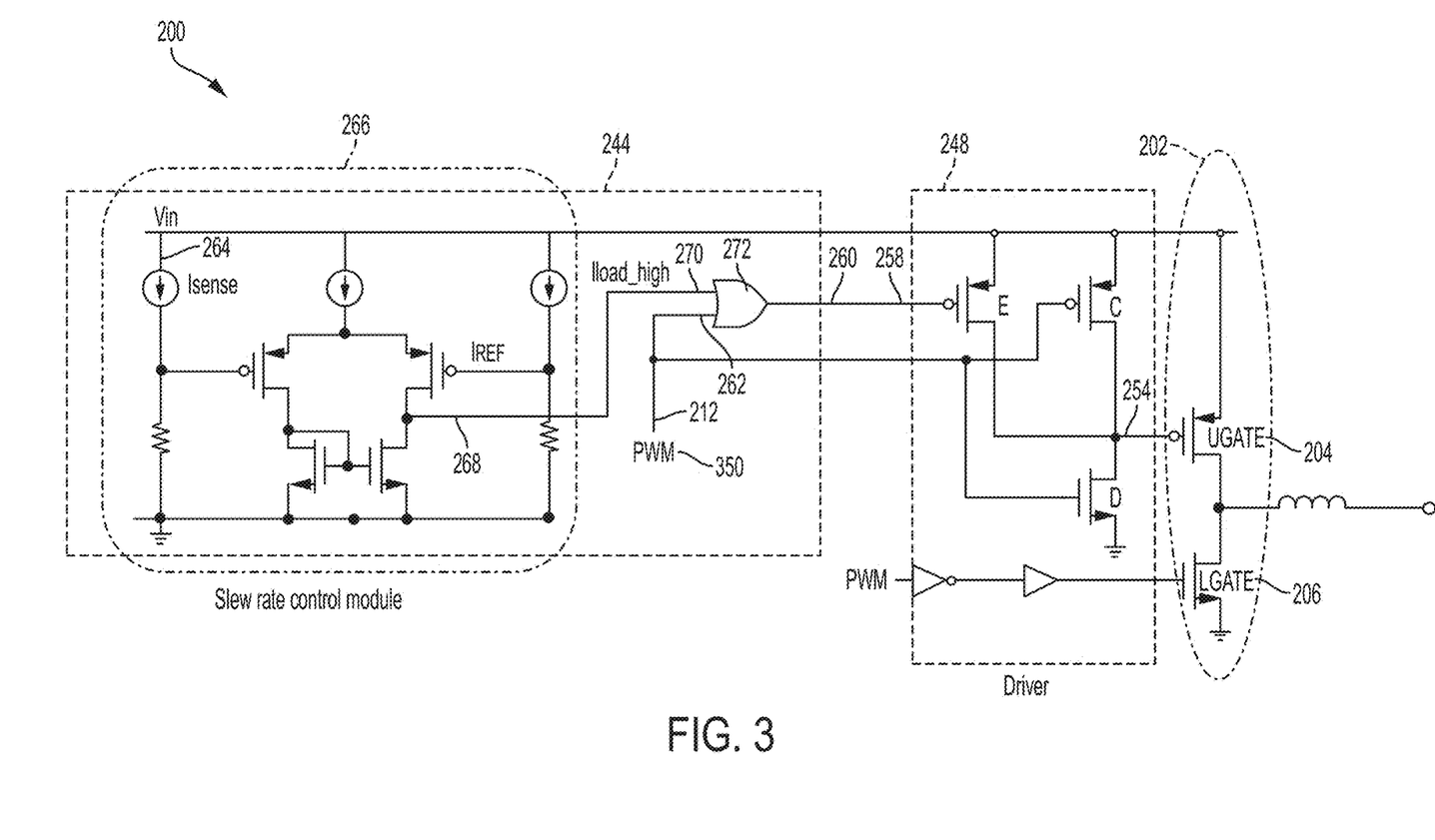
FIG. 3 is a schematic diagram illustrating some implementation details of the inverter circuit of FIG. 2, according to some embodiments.

FIG. 3 is a schematic diagram illustrating some implementation details of the inverter circuit 200, according to some embodiments. The inverter 202 may include a UGATE 204 and an LGATE 206. In some embodiments, the UGATE 204 may be a p-type transistor; the LGATE 206 may be an n-type transistor. The driver 248 may include a transistor C, a transistor D, and a transistor E. The transistors C and E may be p-type transistors. The transistor D may be an n-type transistor. The transistors C and E may be connected in parallel. The transistor C may be connected to the transistor D in series.

The slew rate control module 244 may include a comparator 266 and an OR gate 272. The comparator 266 may include an input terminal 264. The comparator 266 may compare a sense current Isense to a reference current IREF. In some embodiments, the sense current Isense may correlate to the load current IL. For example, the sense current Isense may indicate the magnitude of the load current IL. In some embodiments, the output terminal 268 of the comparator 266 may be a low voltage when the sense current Isense is higher than the reference current IREF; the output terminal 268 of the comparator 266 may be a high voltage when Isense is lower than the reference current IREF. The OR gate 272 may include a first input terminal 270, a second input terminal 262, and an output terminal 260. The first input terminal 270 of the OR gate 272 may be coupled to the output terminal 268 of the comparator 266. The second input terminal 262 of the OR gate 272 may be coupled to the external input terminal 212 of the inverter circuit 200. The output terminal 260 of the OR gate 272 may be coupled to a gate terminal 258 of the transistor E.

The above discussed circuit configuration modifies the slew rate of the driver 248 to a lower level when the inverter circuit 200 drives a heavy load. The inventors have recognized and appreciated that the slew rate of the driver 248 is controlled by the slower one of the output terminal 260 of the slew rate control module 244 and the external input terminal 212 of the inverter circuit 200. For example, during a falling edge transition of the PWM waveform 350, the UGATE 204 turns off when the output terminal 254 of the driver 248 goes high. The slew rate of the driver 248 at the output terminal 254 is controlled by both the output terminal 260 of the slew rate control module 244 and the external input terminal 212 of the inverter circuit 200. The falling edge transition of the PWM waveform 350 turns on the transistor C and off the transistor D. The output terminal 260 of the slew rate control module 244 going low turns on the transistor E. To turn the output terminal 260 of the OR gate 272 low, both the output terminal 270 of the comparator 266 and the PWM have to go low. Therefore, the output terminal 260 is controlled by the slower one of the comparator output and the PWM. Although a slew rate control module is illustrated with respect to the UGATE 204, a person of ordinary skill in the art would appreciate that the LGATE 206 may have a slew rate control module with respect to a rising edge transition of the PWM waveform 350.

Figure 4:
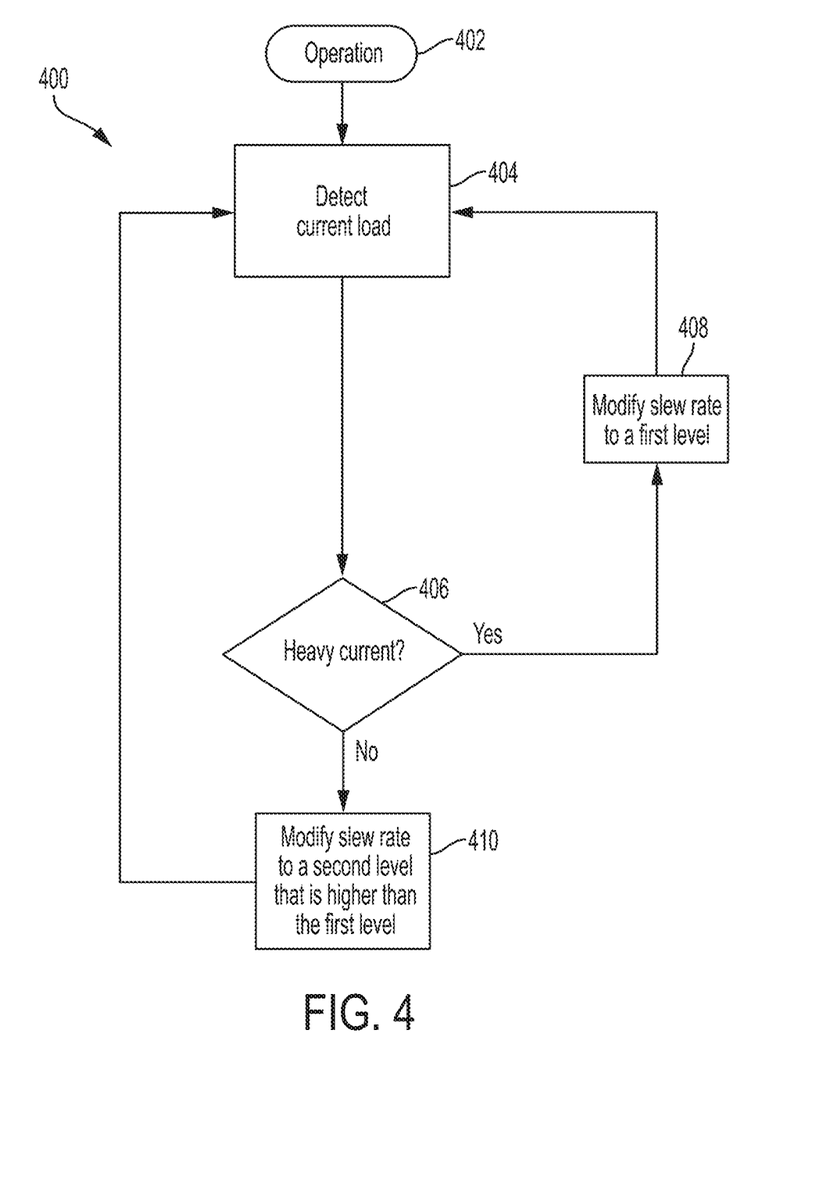
FIG. 4 is a flow chart illustrating an alternative method to dynamically control a slew rate of the inverter's driver in FIG. 2, according to some embodiments.

FIG. 4 is a flow chart illustrating a method 400 to dynamically control a slew rate of the driver 248, according to some embodiments. The method 400 may start form step 402 when an inverter circuit is instructed to operate with dynamic slew rate control by, for example, a system signal from a controller. At step 404, a magnitude of a load current may be detected. The load current may be a current flowing through a load driven by the inverter circuit. 200. The magnitude of the load current may indicate the magnitude of the load driven by the inverter circuit. At step 406, the magnitude of the detected load current may be evaluated by, for example, using the comparator 266. In some embodiments, if the magnitude of the detected load current is determined as heavy, for example, higher than the reference current IREF, a slew rate of driver 248 may be modified to a first level (step 408), which may mean a slower falling/rising edge transition such that the problem of signal bounce may be mitigated. On the other hand, if the magnitude of the detected load current is determined as not heavy, for example, lower than the reference current IREF, the slew rate of driver 248 may be modified to a second level that is higher than the first level (step 410), which may mean a faster falling/rising edge transition.

Figure 5:
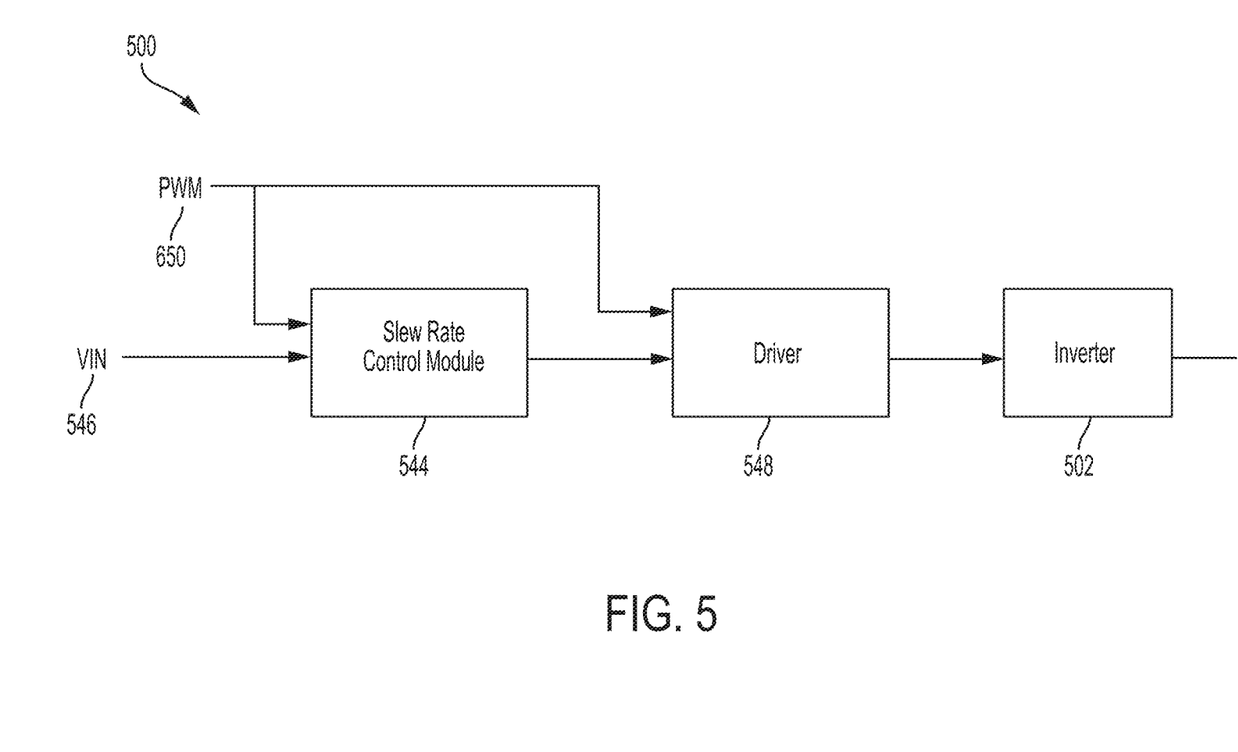
FIG. 5 is a schematic diagram of an inverter circuit with dynamic slew rate control by a voltage representing an input voltage, according to some embodiments.

FIG. 5 is a schematic diagram of an inverter circuit 500 with dynamic slew rate control, according to some embodiments. Instead of receiving the load current IL as illustrated in FIG. 2, a slew rate control module 544 may receive an input voltage VIN 546, which may indicate a magnitude of a load driven by the inverter circuit 500. In some embodiments, the input voltage may be compared to one or more reference voltages. Basing on the comparison results, the load driven by the inverter circuit may be determined as heavy, light, or middle-level.

Figure 6:
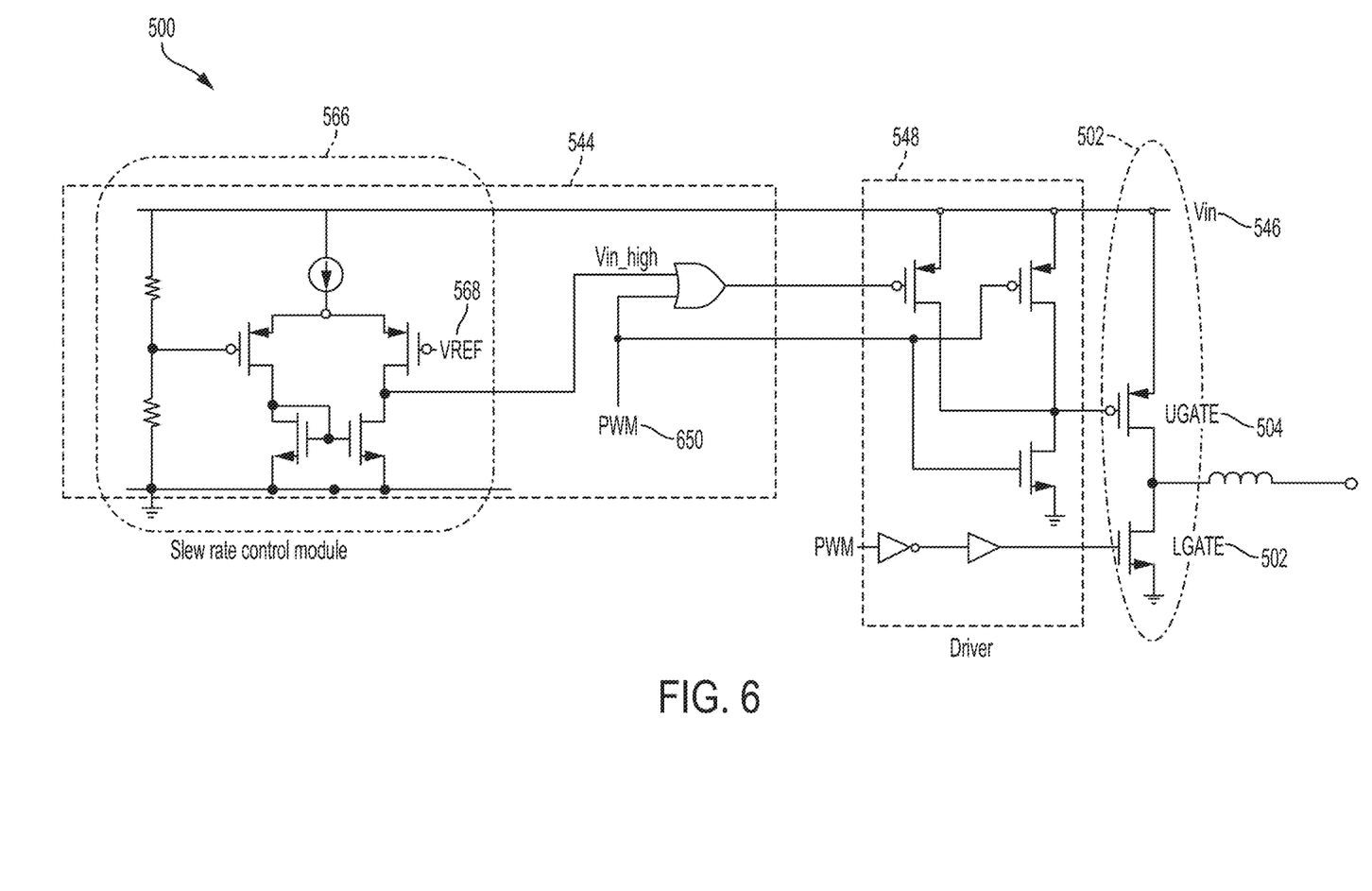
FIG. 6 is a schematic diagram illustrating some implementation details of the inverter circuit of FIG. 5, according to some embodiments.

FIG. 6 is a schematic diagram illustrating some implementation details of the inverter circuit 500, according to some embodiments. Instead of comparing the sense current Isense to the reference current IREF as illustrated in FIG. 3, the slew rate control module 544 compares the input voltage VIN to a reference voltage VREF. In some embodiments, the output terminal 568 of a comparator 566 may be a low voltage when the input voltage VIN is higher than the reference voltage VREF; the output terminal 568 of the comparator 566 may be a high voltage when VIN is lower than the reference VREF. Although a slew rate control module is illustrated with respect to the UGATE 504, a person of ordinary skill in the art would appreciate that the LGATE 506 may have a slew rate control module with respect to a rising edge transition of the PWM waveform 650.

Figure 7:
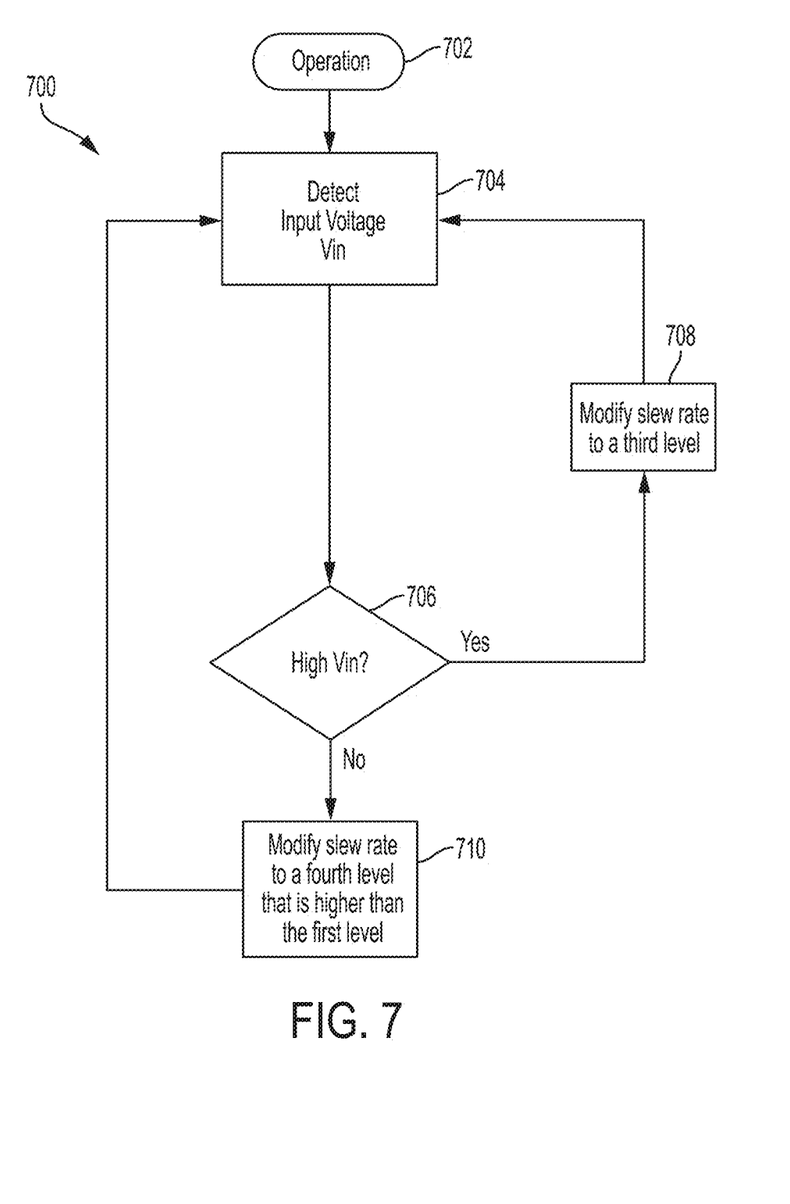
FIG. 7 is a flow chart illustrating a second alternative method to dynamically control a slew rate of the inverter's driver in FIG. 5, according to some embodiments.

FIG. 7 is a flow chart illustrating a method 700 to dynamically control a slew rate of the inverter's driver 548, according to some embodiments. The method 700 may start form step 702 when an inverter circuit is instructed to operate with dynamic slew rate control by, for example, a system signal from a controller. At step 704, a magnitude of an input voltage may be detected. The input voltage may be a voltage shared by a load driven by the inverter circuit 500. The magnitude of the input voltage may indicate the magnitude of the load driven by the inverter circuit. At step 706, the magnitude of the detected input voltage may be evaluated by, for example, using the comparator 566. In some embodiments, if the magnitude of the detected input voltage is determined as high, for example, higher than the reference voltage VREF, a slew rate of the driver 548 may be modified to a third level (step 708), which may mean a slower falling/rising edge transition such that the problem of signal bounce may be mitigated. On the other hand, if the magnitude of the detected input voltage is determined as not high, for example, lower than the reference voltage VREF, the slew rate of the driver 548 may be modified to a fourth level that is higher than the third level (step 710), which may mean a faster falling/rising edge transition.

Figure 8:
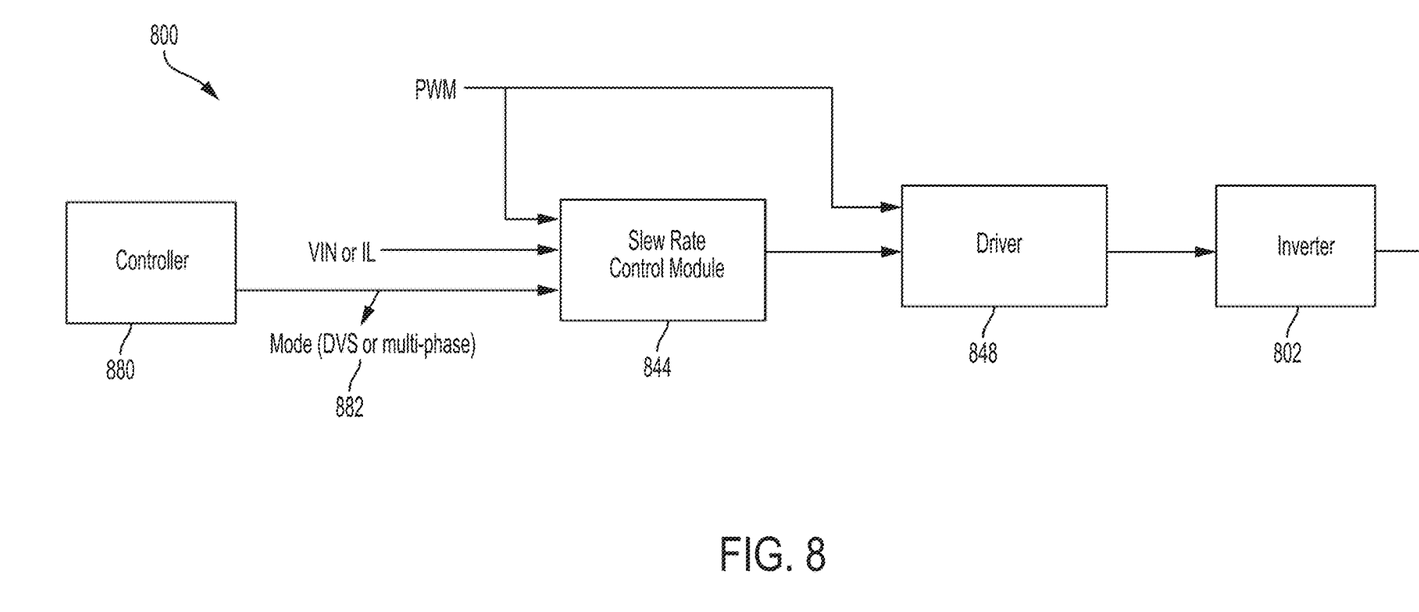
FIG. 8 is a schematic diagram of an inverter circuit with dynamic slew rate control by a mode configuration of the inverter circuit, according to some embodiments.

FIG. 8 is a schematic diagram of an inverter circuit 800 with dynamic slew rate control, according to some embodiments. In addition to receiving the load current IL as illustrated in FIG. 2 or the input voltage VIN as illustrated in FIG. 5, the slew rate control module 844 may also receive a signal 882 from a controller 880. The signal 882 may indicate a mode configuration of the inverter circuit 800. The mode configuration of the inverter circuit may be selected from a plurality of modes such as dynamic voltage scaling (DVS) mode and multi-phase mode.

Figure 9:
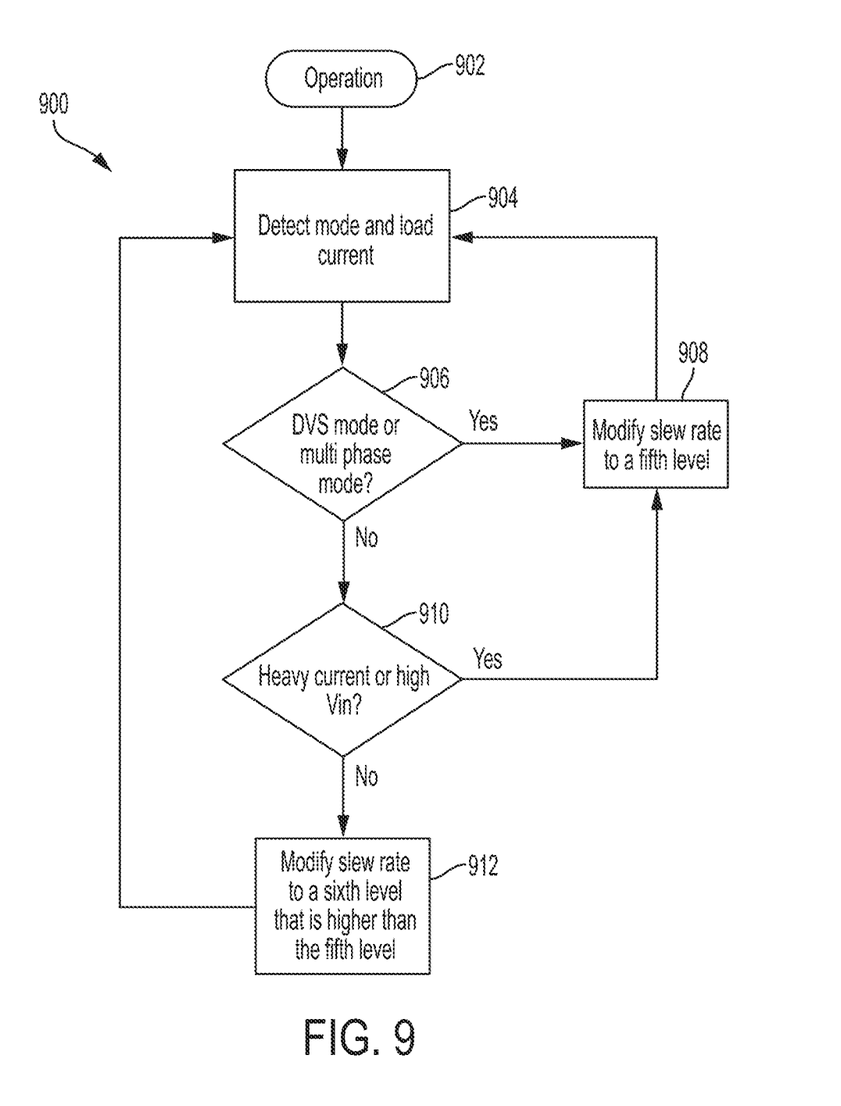
FIG. 9 is a flow chart illustrating a method to dynamically control a slew rate of the inverter's driver in FIG. 8, according to some embodiments.

FIG. 9 is a flow chart illustrating a method 900 to dynamically control slew rate of an inverter's driver 848 in FIG. 8, according to some embodiments. The method 900 may start form step 902 when an inverter circuit is instructed to operate with dynamic slew rate control by, for example, a system signal from a controller. At step 904, a mode configuration of the inverter circuit 800 may be detected. The mode configuration of the inverter circuit may be selected from a plurality of modes such as dynamic voltage scaling (DVS) mode and multi-phase mode. At step 906, it may be determined whether the inverter circuit 800 operating in the dynamic voltage scaling (DVS) mode or the multi-phase mode. In some embodiments, if it is determined that the inverter circuit 800 operates in either the dynamic voltage scaling (DVS) mode or the multi-phase mode, a slew rate of driver 848 may be modified to a fifth level (step 908), which may mean a slower falling/rising edge transition such that the problem of signal bounce may be mitigated. On the other hand, if it is determined that the inverter circuit 800 operates in neither the dynamic voltage scaling (DVS) mode nor the multi-phase mode, the method 900 may proceed to step 910.

In some embodiments, a magnitude of a load driven by the inverter circuit 800 may also be detected at step 904. In some embodiments, a magnitude of a load driven by the inverter circuit 800 may be detected at a later step, for example, after step 906. In some embodiments, the magnitude of the load driven by the inverter circuit may be indicated by a load current. In some embodiments, the magnitude of the load driven by the inverter circuit may be indicated by an input voltage. At step 910, the magnitude of the load driven by the inverter circuit may be evaluated. In some embodiments, if the magnitude of the load driven by the inverter circuit is determined as heavy, a slew rate of the driver 848 may be modified to the fifth level (step 908), which may mean a slower falling/rising edge transition such that the problem of signal bounce may be mitigated. On the other hand, if the magnitude of the load driven by the inverter circuit is determined as not heavy, the slew rate of the driver 848 may be modified to a sixth level that is higher than the fifth level (step 912), which may mean a faster falling/rising edge transition.

Figure 10A:
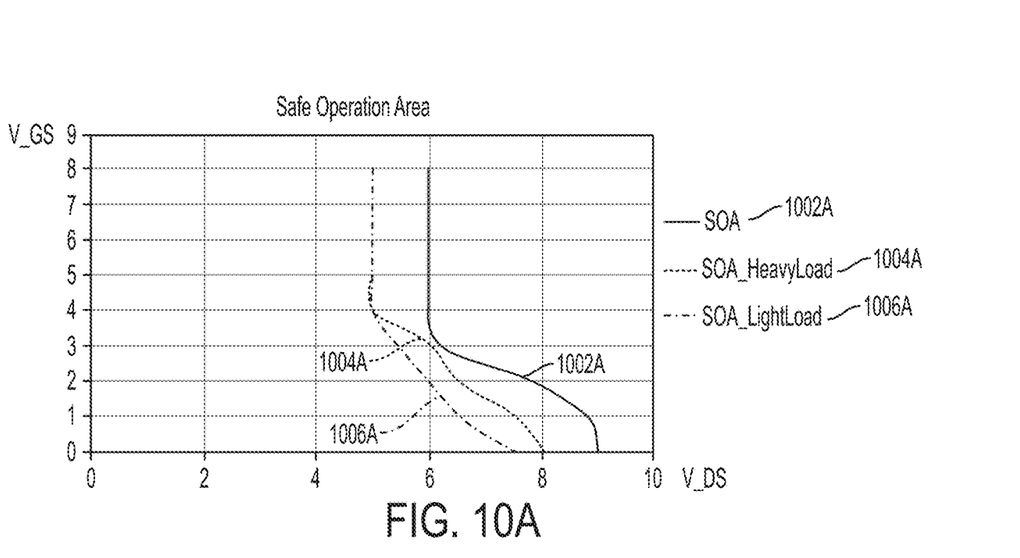
FIG. 10A is a graph that compares safe operating areas (SOAs) under different loading conditions for transistors in an inverter's driver without dynamic slew rate control.

FIG. 10A is a graph that compares safe operation areas (SOAs) under different loading conditions for transistors in an inverter's driver without dynamic slew rate control, such as the UGATE_DRIVER 108. A curve 1002A illustrates an intrinsic SOA of a transistor, for example, without the influence of any load. A curve 1004A indicates an SOA of the transistor under a heavy loading condition. A curve 1006A indicates an SOA of the transistor under a light loading condition. The SOA of the transistor is adversely reduced from the intrinsic SOA due to the loading conditions. For example, when a gate terminal of a transistor is biased at 2 V (V_GS), the curve 1002A indicates that, without any load, the transistor will function normally as long as a drain terminal of the transistor is biased below 8 V (V_DS); the curve 1004A indicates that, with a heavy load, the drain terminal of the transistor should be biased below 6.4 V to ensure the transistor function normally; and the curve 1006A indicates that, with a light load, the drain terminal of the transistor should be biased below 6 V to ensure the transistor function normally.

Figure 10B:
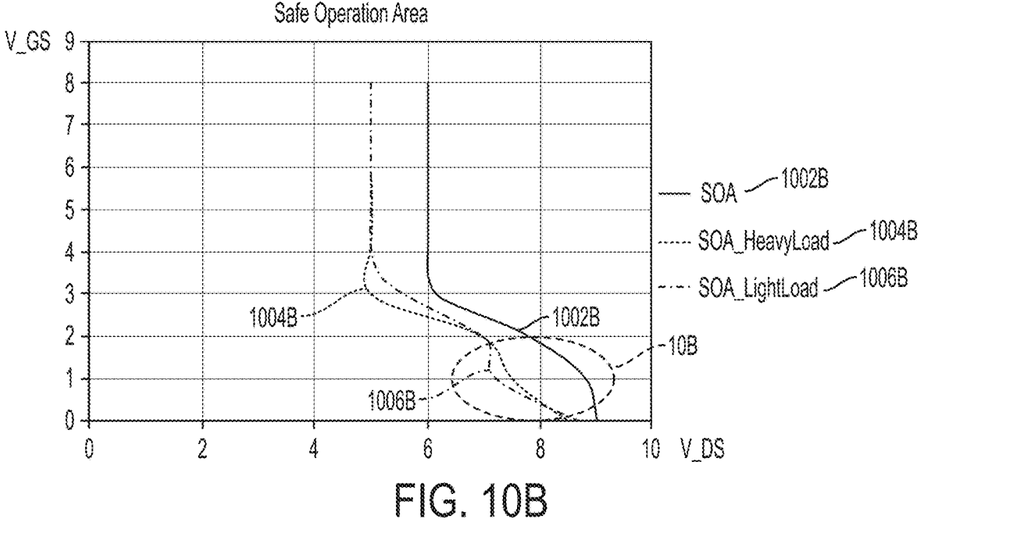
FIG. 10B is a graph that compares SOAs under different loading conditions for transistors in an inverter's driver with dynamic slew rate control, according to some embodiments.

FIG. 10B is a graph that compares SOAs under different loading conditions for transistors in an inverter's driver with dynamic slew rate control, according to some embodiments. A curve 1002B illustrates an intrinsic SOA of a transistor, for example, without the influence of any load. A curve 1004B indicates an SOA of the transistor under a heavy loading condition. A curve 1006B indicates an SOA of the transistor under a light loading condition. While the SOA of the transistor is still adversely reduced from the intrinsic SOA due to the loading conditions, as highlighted by circle 10B, curves 1004B and 1006B indicate an enlarged SOA for transistors in an inverter's driver with dynamic slew rate control compared with transistors in an inverter's driver without slew rate control. For example, when a gate terminal of a transistor is biased at 2 V (V_GS), like the curve 1002A, the curve 1002B indicates that, without any load, the transistor will function normally as long as a drain terminal of the transistor is biased below 8 V (V_DS); unlike the curve 1004A, the curve 1004B indicates that, with a heavy load, a safe operation range of the drain terminal of the transistor is extended to 7.2 V from 6.4 V; and unlike the curve 1006A, the curve 1006B indicates that, with a light load, a safe operation range of the drain terminal of the transistor is extended to 7.2 V from 6 V.

Various aspects of the apparatus and techniques described herein may be used alone, in combination, or in a variety of arrangements not specially discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

The terms "approximately", "substantially," and "about" may be used to mean within ±20% of a target value in some embodiments, within ±10% of a target value in some embodiments, within ±5% of a target value in some embodiments, and yet within ±2% of a target value in some embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for controlling a driver of an inverter of an inverter circuit, the method comprising:
   detecting a magnitude of a load driven by the inverter; and
   modifying a slew rate of the driver of the inverter by controlling an input of the driver based on the magnitude of the load,
   wherein the slew rate is a rate of change of an output voltage of the driver during a transition between output voltage levels of the driver,
   wherein detecting the magnitude of the load driven by the inverter comprises detecting a mode configuration of the inverter circuit, and modifying the slew rate of the driver of the inverter based on the magnitude of the load comprises modifying the slew rate of the driver of the inverter based on the detected mode configuration of the inverter circuit, and
   wherein the mode configuration of the inverter circuit is selected from a plurality of modes comprising dynamic voltage scaling (DVS) mode.

2. The method of claim 1, wherein modifying the slew rate of the driver of the inverter comprises reducing the slew rate of the driver of the inverter when the detected magnitude of the load increases.

3. The method of claim 1, wherein modifying the slew rate of the driver of the inverter comprises increasing the slew rate of the driver of the inverter when the detected magnitude of the load decreases.

4. The method of claim 1, wherein detecting the magnitude of the load driven by the inverter comprises detecting a current representing a load current.

5. The method of claim 4, wherein modifying the slew rate of the driver of the inverter comprises modifying the slew rate of the driver of the inverter to a first predetermined level when the detected current is higher than a reference current.

6. The method of claim 5, wherein modifying the slew rate of the driver of the inverter further comprises modifying the slew rate of the driver of the inverter to a second predetermined level when the detected current is lower than the reference current, wherein the second predetermined level is higher than the first predetermined level.

7. The method of claim 1, wherein detecting the magnitude of the load driven by the inverter comprises detecting a voltage representing an input voltage.

8. The method of claim 7, wherein modifying the slew rate of the driver of the inverter comprises modifying the slew rate of the driver of the inverter to a third predetermined level when the detected voltage is higher than a reference voltage.

9. The method of claim 8, wherein modifying the slew rate of the driver of the inverter further comprises modifying the slew rate of the driver of the inverter to a fourth predetermined level when the detected voltage is lower than the reference voltage, wherein the fourth predetermined level is higher than the third predetermined level.

10. An inverter circuit comprising:
    an inverter;
    a driver coupled to the inverter, the driver being configured to receive a first signal; and
    a slew rate control module coupled to an input of the driver, the slew rate control module being configured to receive the first signal and a second signal indicating a magnitude of a load driven by the inverter circuit, wherein the slew rate control module modifies a slew rate of the driver based on the second signal, and the slew rate is a rate of change of an output voltage of the driver during a transition between output voltage levels of the driver, wherein the second signal is a current representing a load current, and the slew rate control module comprises a comparator configured to compare the current to a reference current, and wherein the slew rate control module comprises an OR gate configured to receive the first signal and an output of the comparator, and the OR gate outputs to the driver.

11. The inverter circuit of claim 10, wherein the slew rate control module is configured to receive a third signal indicating a mode configuration of the inverter circuit, and the slew rate control module modifies the slew rate of the driver based on the third signal.

12. An inverter circuit comprising:
an inverter;
a driver coupled to the inverter, the driver being configured to receive a first signal; and
a slew rate control module coupled to the driver, the slew rate control module being configured to receive the first signal and a second signal indicating a magnitude of a load driven by the inverter circuit, wherein the slew rate control module modifies a slew rate of the driver based on the second signal, and the slew rate is a rate of change of an output voltage of the driver during a transition between output voltage levels of the driver, wherein:
the slew rate control module is configured to receive a third signal indicating a mode configuration of the inverter circuit,
the slew rate control module modifies the slew rate of the driver based on the third signal, and
the mode configuration of the inverter circuit is selected from a plurality of modes comprising dynamic voltage scaling (DVS) mode.

13. An inverter circuit comprising,
an inverter;
a driver coupled to the inverter, the driver being configured to receive a first signal; and
a slew rate control module coupled to an input of the driver, the slew rate control module being configured to receive the first signal and a second signal indicating a magnitude of a load driven by the inverter circuit, wherein the slew rate control module modifies a slew rate of the driver based on the second signal, and the slew rate is a rate of change of an output voltage of the driver during a transition between output voltage levels of the driver, wherein the second signal is a voltage representing an input voltage, and the slew rate control module comprises a comparator configured to compare the voltage to a reference voltage, and wherein the slew rate control module comprises an OR gate configured to receive the first signal and an output of the comparator, and the OR gate outputs to the driver.

14. The inverter circuit of claim 10, wherein the slew rate control module reduces the slew rate of the driver when the second signal indicates that the magnitude of the load increases.

15. The inverter circuit of claim 10, wherein the slew rate control module increases the slew rate of the driver when the second signal indicates that the magnitude of the load decreases.

16. The inverter circuit of claim 12, wherein the second signal is a current representing a load current, and the slew rate control module comprises a comparator configured to compare the current to a reference current.

17. The inverter circuit of claim 12, wherein the second signal is a voltage representing an input voltage, and the slew rate control module comprises a comparator configured to compare the voltage to a reference voltage.

18. The inverter circuit of claim 12, wherein the slew rate control module reduces the slew rate of the driver when the second signal indicates that the magnitude of the load increases.

19. The inverter circuit of claim 12, wherein the slew rate control module increases the slew rate of the driver when the second signal indicates that the magnitude of the load decreases.

20. The inverter circuit of claim 13, wherein the slew rate control module is configured to receive a third signal indicating a mode configuration of the inverter circuit, and the slew rate control module modifies the slew rate of the driver based on the third signal.

* * * * *